US012695082B2

(12) United States Patent
Zhang et al.

(10) Patent No.: US 12,695,082 B2
(45) Date of Patent: Jul. 28, 2026

(54) ELECTRODE PIECE AND BATTERY

(71) Applicant: Zhuhai CosMX Battery Co., Ltd., Zhuhai (CN)

(72) Inventors: Jian Zhang, Zhuhai (CN); Leiming Sun, Zhuhai (CN); Shuanghu Zhang, Zhuhai (CN); Chong Peng, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 710 days.

(21) Appl. No.: 18/066,274

(22) Filed: Dec. 14, 2022

(65) Prior Publication Data

US 2023/0122728 A1 Apr. 20, 2023

Related U.S. Application Data

(63) Continuation of application No. PCT/CN2021/143101, filed on Dec. 30, 2021.

(30) Foreign Application Priority Data

Dec. 30, 2020 (CN) .......................... 202011628655.5

(51) Int. Cl.

| | |
|---|---|
| *H01M 4/134* | (2010.01) |
| *H01M 4/02* | (2006.01) |
| *H01M 4/40* | (2006.01) |
| *H01M 4/70* | (2006.01) |

(52) U.S. Cl.
CPC .......... *H01M 4/134* (2013.01); *H01M 4/405* (2013.01); *H01M 4/70* (2013.01); *H01M 2004/027* (2013.01); *H01M 2004/028* (2013.01)

(58) Field of Classification Search
CPC ........................... H01M 10/052; H01M 4/366
See application file for complete search history.

(56) References Cited

U.S. PATENT DOCUMENTS

| | | | |
|---|---|---|---|
| 2013/0004855 A1* | 1/2013 | Yamazaki | ............. H01M 4/133 427/113 |
| 2020/0020921 A1* | 1/2020 | Shiozaki | .......... H01M 10/0525 |

FOREIGN PATENT DOCUMENTS

| | | |
|---|---|---|
| CN | 205159450 U | 4/2016 |
| CN | 105742565 A | 7/2016 |
| CN | 110431692 A | 11/2019 |

(Continued)

OTHER PUBLICATIONS

Dai et al., CN 105742565 B, Machine Translation, Mar. 5, 2019 (Year: 2019).*

(Continued)

*Primary Examiner* — Galen H Hauth

(74) *Attorney, Agent, or Firm* — Kilpatrick Townsend & Stockton LLP

(57) ABSTRACT

The present disclosure provides an electrode piece and a battery. The electrode piece includes a current collector and a functional layer arranged on a first surface of the current collector, a tab is further arranged in middle of the first surface, and the functional layer on the first surface has a first slope area near the tab and a first normal area away from the tab, and a thickness of the first slope area gradually decreases along a direction towards the tab. The present disclosure can improve performances of the battery, such as rate capacity, safety and the like.

8 Claims, 1 Drawing Sheet

(56)     References Cited

FOREIGN PATENT DOCUMENTS

| CN | 111540879 | A  | 8/2020  |
|----|-----------|----|---------|
| CN | 111740066 | A  | 10/2020 |
| CN | 111816838 | A  | 10/2020 |
| CN | 111916667 | A  | 11/2020 |
| CN | 211980765 | U  | 11/2020 |
| CN | 211980772 | U  | 11/2020 |
| CN | 212230551 | U  | 12/2020 |
| CN | 112820855 | A  | 5/2021  |
| JP | 2014089856 | A | 5/2014  |
| JP | 2023525744 | A | 6/2023  |
| WO | 2018021214 | A1 | 2/2018 |
| WO | 2019167544 | A1 | 9/2019 |

OTHER PUBLICATIONS

Notification to Grant Patent Right for Invention received in the corresponding Chinese application 202011628655.5, issued on Nov. 9, 2023.

The first Office Action received in corresponding CN Application 202011628655.5, mailed Nov. 12, 2021.

The second Office Action received in corresponding CN Application 202011628655.5, mailed Apr. 11, 2022.

Decision on Rejection received in corresponding CN Application 202011628655.5, mailed Sep. 13, 2022.

The international search report and written opinion received in corresponding International Application PCT/CN2021/143101, mailed Mar. 30, 2022.

Office Action of Japanese Patent No. 2023-500036 Mailed Feb. 27, 2024.

* cited by examiner

ELECTRODE PIECE AND BATTERY

CROSS-REFERENCE TO RELATED APPLICATION

The present application is a continuation of International Application No. PCT/CN2021/143101, filed on Dec. 30, 2021, which claims priority to Chinese Patent Application No. 202011628655.5, filed with China National Intellectual Property Administration on Dec. 30, 2020, entitled "Electrode Piece and Battery", both of which are hereby incorporated by reference in their entireties.

TECHNICAL FIELD

The present disclosure relates to an electrode piece and a battery, belonging to the field of batteries.

BACKGROUND

Lithium-ion battery is the most important type of battery in consumer electronic products such as smart phones and notebook computers. With the upgrading of consumer electronic products such as smart mobilephones, the requirements for energy density, charging speed and safety performance of lithium-ion batteries are becoming higher and higher. The tab of the soft-package lithium-ion battery with conventional structure is welded at one end of the electrode piece, but the lithium-ion battery with such structure has a large internal resistance, which is not conducive to rapid charging of the battery. Welding the tab in or near the middle of the electrode piece can effectively reduce the internal resistance of the battery and is conducive to improve the charging speed of the battery. Usually, after a functional coating layer is coated on a current collector, a coating at a preset tab position in the middle of the electrode piece is removed, to expose the current collector and then the tab is welded, and then an adhesive tape is applied for protection. In addition to adhering with an upper surface of the tab, the adhesive tape usually needs to be adhered with the current collector exposed around the tab and the functional coating layer around the tab (that is, an area of the functional coating layer close to the tab) to cover the tab and realize the protection of the tab. However, in a conventional structure of the electrode piece, there is a height difference between an area of the functional coating layer near the tab and the current collector. The height difference is basically consistent with the thickness of the functional coating layer, so that the adhesive tape cannot fully fit with the current collector exposed around the tab. As a result, the area of the functional coating layer near the tab is prone to enrich electrolyte, which makes the concentration of lithium ion in this area too different from the concentration of lithium ion in other areas, leading to problems such as easy lithium precipitation, thereby reducing safety and rate capability of the electrode and battery, and the like.

SUMMARY

The present disclosure provides an electrode piece, which can effectively improve protection of an area near the tab, avoid problems such as lithium precipitation, and improve, for example, safety and rate capability of the electrode piece and battery. an area of a tab of the negative electrode The present disclosure further provides a battery, which adopts the above electrode piece and has good performances, such as safety and rate capability.

In one aspect, the present disclosure provides an electrode piece, including a current collector and a functional layer arranged on a first surface of the current collector, where a tab is further arranged in middle of the first surface, and the functional layer on the first surface has a first slope area near the tab and a first normal area away from the tab, and a thickness of the first slope area gradually decreases along a direction towards the tab.

According to an embodiment of the present disclosure, in a projection of the electrode piece parallel to a thickness direction of the electrode piece, an endpoint of the first slope area away from the tab is c, and an endpoint of the first slope area near the tab is d, an angle between a connecting line between c and d and a plane parallel to a surface of the electrode piece is an acute angle $\alpha$, and $\alpha$ is 10-80°.

According to an embodiment of the present disclosure, a width of the first slope area is 0.25-3 mm.

According to an embodiment of the present disclosure, the functional layer includes an active material layer and a bottom coating layer arranged between the active material layer and a surface of the current collector, and the active material layer has the first slope area and the first normal area.

According to an embodiment of the present disclosure, the bottom coating layer has a second slope area near the tab and a second normal area away from the tab, and a thickness of the second slope area gradually decreases along a direction towards the tab.

According to an embodiment of the present disclosure, in projection of the electrode piece parallel to the thickness direction of the electrode piece, an endpoint of the second slope area away from the tab is e, and an endpoint of the second slope area near the tab is f, an angle between a connecting line between e and f and a plane parallel to a surface of the electrode piece is an acute angle $\beta$, and $\beta$ is 10-80°.

According to an embodiment of the present disclosure, a minimum distance from the active material layer to the tab is not greater than a minimum distance from the bottom coating layer to the tab.

According to an embodiment of the present disclosure, a minimum distance from the active material layer to the tab is m, a minimum distance from the bottom coating layer to the tab is n, $0 \le n - m \le 3$ mm.

According to an embodiment of the present disclosure, a minimum distance from a surface of the first slope area to the first surface of the current collector is greater than a maximum distance from a surface of the bottom coating layer to the first surface of the current collector.

In another aspect, the present disclosure provides a battery, including the above electrode piece.

The implementation of the present disclosure has at least the following beneficial effects:

by setting a slope area (i.e., the first slope area) in an area of the functional layer close to the tab, the electrode piece provided by the present disclosure can reduce a height difference between the slope area and the tab and the current collector exposed around the tab so that the adhesive tape can adhere to the tab, the current collector exposed around the tab and the slope area better, which improves the protection effect to the area where the tab is located, avoids the enrichment of electrolyte and the resulting lithium precipitation and other problem, thereby improving, for example, rate capability, safety, stability and use life of the electrode and battery.

ILLUSTRATION OF REFERENCE SIGNS

1: current collector; 2: bottom coating layer; 3: active material layer; 4: tab; 21: second slope area; 22: second normal area; 31: first slope area; 32: first normal area; α: first slope angle; β: second slope angle; a: width of the first slope area; b: distance from end of bottom coating layer near tab to end of active material layer near tab.

DESCRIPTION OF EMBODIMENTS

In order to enable those skilled in the art to better understand the solution of the present disclosure, the following describes the present application in detail in combination with the accompanying drawings below.

Figure 1:
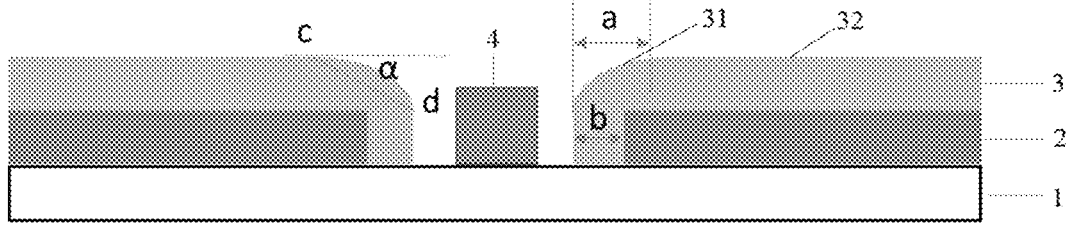
FIG. 1 is a schematic sectional diagram of a first surface of an electrode piece according to an embodiment of the present disclosure.
Figure 2:
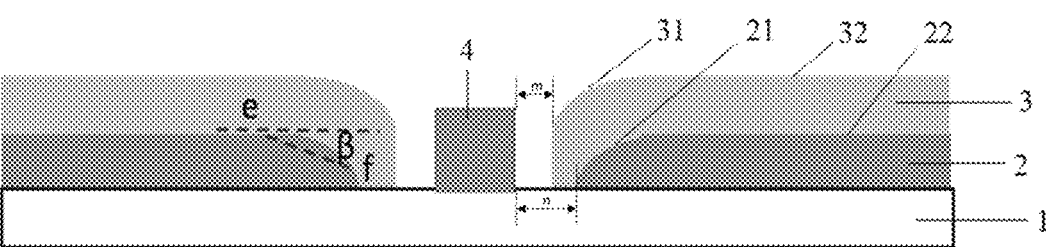
FIG. 2 is a schematic sectional diagram of a first surface of an electrode piece according to another embodiment of the present disclosure.

In one aspect, the present disclosure provides an electrode piece, as shown in FIGS. 1-2, the electrode piece includes a current collector 1 and a functional layer arranged on a first surface of the current collector, a tab 4 is further arranged in middle of the first surface, the functional layer on the first surface has a first slope area 31 near the tab 4 and a first normal area 32 away from the tab 4, and a thickness of the first slope area 31 gradually decreases along a direction towards the tab 4.

By setting the first slop area, the electrode piece provided by the present disclosure is conducive to make the adhesive tape adhere to the tab, the current collector exposed around the tab and the slope area around the tab tightly, so as to improve the covering and protection effect to the tab, and avoid the enrichment of electrolyte around the tab and the resulting lithium precipitation and other problem, thereby improving rate capability, safety, stability and use life and other performance of the electrode and battery.

Specifically, in the electrode piece of the present disclosure, the function layer can only be arranged on the first surface, and the function layer also can be arranged on the second surface opposite to the first surface at the same time (i.e., both the positive and negative surfaces of the current collector are provided with the functional layer). For a specific implementation, it can be set according to the needs, where the functional layer on the second surface can be a conventional structure in the field, which is not specifically restricted by the present disclosure and will not be repeated.

In a specific embodiment, a functional layer is also arranged on the second surface, and a thickness of the functional layer on the second surface is equal to a thickness of the functional layer of the first normal area on the first surface, and the sum of the thickness of the functional layer on the second surface and the thickness of the functional layer of the first normal area on the first surface is 90-120 μm.

According to the study of the present disclosure, as shown in FIG. 1, in projection of the electrode piece parallel to a thickness direction of the electrode piece, an endpoint of the first slope area 31 away from the tab 4 is c, and an endpoint of the first slope area 31 near the tab 4 is d, the angle (hereinafter referred to as first slope angle) between the connecting line between c and d and the plane parallel to the surface of the electrode piece is an acute angle α, and α is 10-80°, for example, 10°, 15°, 20°, 25°, 30°, 35°, 40°, 45°, 50°, 55°, 60°, 65°, 70°, 75°, 80° or a range composed of any two of them, such as 20-80° or 20-70°, which is conducive to improve the rate capability and stability of the electrode piece. Where c is a critical point (i.e., an intersection point of a dividing line between the first normal area 32 and the first slope area 31 in the above projection) of change of the thickness of the functional layer, and d is an intersection point of a dividing line between the first slope area 31 (arc or slope) and a vertical surface of the functional layer parallel to the thickness direction of the functional layer in the above projection.

Further, a width a of the first slope area 31 can be 0.25-3 mm, further can be 0.5-2.5 mm or 0.5-2 mm or 0.5-1.5 mm. The width a is a distance from an end of the first slope area 31 away from the tab to an end of the first slope area 31 near the tab in a direction parallel to a plane in which a surface of the functional layer is located, or the width a is a distance from a dividing line between the first normal area 32 and the first slope area 31 to the dividing line between the first slope area 31 and the vertical surface of the functional layer parallel to the thickness direction of the functional layer in the direction parallel to the plane in which the surface of the functional layer is located. In relative, if a is too small (<0.25 mm), it will affect the adhesion of the adhesive tape to the whole interface including the tab, the current collector exposed around the tab and the functional layer around the tab, and the improvement effect on the rate capability and safety and other performance of the electrode piece is relatively limited; and if a is too large (>3 mm), it will lead to greater loss of the functional layer and affect the energy density and capacity and other performance of the electrode piece.

In order to further improve the safety and other performance of the battery, in an embodiment of the present disclosure, as shown in FIGS. 1-2, the functional layer includes an active material layer 3 and a bottom coating layer 2 located between the active material layer 3 and the surface of the current collector 1, and the active material layer 3 has the first slope area 31 and the first normal area 32.

Further, the bottom coating layer 2 has a second slope area 21 near the tab 4 and a second normal area 22 away from the tab 4, and a thickness of the second slope area 21 gradually decreases along the direction towards the tab 4.

Specifically, in projection of the electrode piece parallel to a thickness direction of the electrode piece, an endpoint of the second slope area 21 away from the tab 4 is e, and an endpoint of the second slope area 21 near the tab 4 is f, an angle between a connecting line between e and f and a plane parallel to a surface of the electrode piece is an acute β (hereinafter referred to as second slope angle), and β is 10-80°, for example, 10°, 15°, 20°, 25°, 30°, 35°, 40°, 45°, 50°, 55°, 60°, 65°, 70°, 75°, 80° or a range composed of any two of them. Where e is a critical point of thickness change of the bottom coating layer (i.e., an intersection point of a dividing line between the second normal area 22 and the second slope area 21 in the above projection), and f is an intersection point of a dividing line between the second slope area 21 (arc or slope) and a vertical surface of the bottom coating layer parallel to a thickness direction of the bottom coating layer in the above projection. It is generally preferred that a connecting line between e and c is in the same direction as the thickness direction of the functional layer (that is, starting positions of the first slope area 31 and the second slope area 32 are the same in the direction near the tab).

In general, a minimum distance from the active material layer 3 to the tab 4 is not greater than a minimum distance from the bottom coating layer 2 to the tab 4, which is conducive to more homogeneous and smooth surface of the whole functional layer and improves safety and rate capability and other performance of the functional layer.

Specifically, the minimum distance from the active material layer 3 to the tab 4 is m, and the minimum distance from the bottom coating layer 2 to the tab 4 is n, 3 mm (That is, as shown in FIG. 1, a distance b from an end of the bottom coating layer 2 near the tab 4 to an end of the active material layer 3 near the tab 4 is 0-3 mm), and further, $0 \leq n-m \leq 2.5$ mm, or $0 \leq n-m \leq 2$ mm, or $0 \leq n-m \leq 1.5$ mm, or In relative, if n–m is too small (<0), a part of the bottom coating layer not covered by the active material layer will affect the flatness of the surface of the functional layer, and the bottom coating layer usually has a strong adhesion, and is difficult to be cleaned or scraped off, affecting the manufacture of the electrode piece; and if n–m is too large (>3 mm), it will cause a large part of the active material layer near the tab cannot to be protected by the bottom coating layer, which is not conducive to the safety and other performance of the electrode piece.

It was found through further research, a minimum distance from the surface of the first slope area 31 to a first surface of the current collector 1 is greater than a maximum distance from a surface of the bottom coating layer 2 to the first surface of the current collector 1. That is to say, with the first surface of the current collector 1 as a reference, a lowest point of the surface of the first slope area 31 is located above the bottom coating layer 2, meaning that when the bottom coating layer is not provided with the second slope area (i.e., the bottom coating layer is entirely composed of the second normal area), the minimum distance from the surface of the first slope area 31 to the first surface of the current collector 1 is greater than the thickness of the bottom coating layer 2; and when the bottom coating layer has the second slope area 21 and the second normal area 22, the minimum distance between the surface of the first slope area 31 and the first surface of the current collector 1 is greater than the thickness of the bottom coating layer 2 corresponding to the second normal area 22.

The bottom coating layer of the present disclosure may be a conventional safety coating layer with a function of protection in the field, such as an inorganic particle coating layer and/or a polymer coating layer. The inorganic particle coating layer may be a conventional ceramic coating layer without an active material, and also may be an active material layer containing an active material and having a higher binder content than the above active material layer, or a mixed coating layer of the ceramic coating layer and the active material layer. There is a large stripping force (adhesive force) between the bottom coating layer and the current collector, with the stripping force being usually more than 30 N/m, which can enhance the adhesion of the functional layer to the current collector and improve the safety and use life of the electrode piece and other performance thereof.

The stripping force of the bottom coating layer relative to the current collector is larger than the stripping force of the active material layer relative to the current collector, and specifically, the stripping force of each coating layer relative to the current collector can be controlled by adjusting the content of the binder in the coating layer. In general, the mass content of binder in the bottom coating layer is more than 3 times the mass content of binder in the active material layer, which facilitates a higher stripping force of the bottom coating layer relative to the current collector and improves the safety of the electrode piece, and at the same time, also improves the energy density and other performance of the electrode piece.

In a preferred embodiment of the present disclosure, the bottom coating layer is an inorganic particle coating layer, and raw materials of the inorganic particle coating layer include an inorganic particle material, a conductive agent and a binder, where the mass content of the inorganic particle material is 55%-96%, the mass content of the binder is 3%-40%, and the mass content of the conductive agent is 1%-5%.

Specifically, the inorganic particle material can be selected from at least one of lithium cobaltate (LCO), nickel-cobalt-manganese ternary material (NCM), nickel-cobalt-aluminum ternary material (NCA), nickel-cobalt-manganese-aluminum quaternary material (NCMA), lithium ferrous phosphate (LFP), lithium manganese phosphate (LMP), lithium vanadium phosphate (LVP), lithium manganite (LMO), lithium-rich manganese-based materials, alumina, boehmite, magnesium oxide, titanium oxide, silicon oxide, calcium oxide, manganese oxide, zirconium oxide, yttrium oxide, hafnium oxide, cerium oxide and thorium oxide.

The active material layer may also be a conventional active material layer in the field. In a preferred embodiment, raw materials of the active material layer include an active material, a binder and a conductive agent, where the mass content of the active material is 93%-99%, the mass content of the binder is 0.5%-2%, and the mass content of the conductive agent is 0.5%-5%.

Specifically, the electrode piece can be a positive electrode piece or a negative electrode piece. For example, in an embodiment, the electrode piece is a positive electrode piece, and the functional coating layer includes the active material layer, and the raw materials of the active material layer include the active material, the binder and the conductive agent. Specifically, the active material can be lithium-including active material and other conventional positive electrode active materials in this field, such as it can include at least one of lithium cobaltate, lithium manganate, lithium nickelate, lithium nickel cobalt manganate, lithium ferrous phosphate, lithium iron manganese phosphate, lithium vanadium phosphate, lithium vanadyl phosphate, lithium-rich manganese-based material, and lithium nickel cobalt aluminate, and the current collector can be an aluminum foil and other conventional positive current collectors in this field. In another embodiment, the electrode piece is a negative electrode piece, and the functional coating layer includes the active material layer. The raw materials of the active material layer include the active material, the binder and the conductive agent. Specifically, the active material can include at least one of graphite, mesocarbon microbead, soft carbon, hard carbon, silicon material, silicon oxide material, silicon carbon material and lithium titanate materials, and the current collector can be a copper foil and other conventional negative current collectors in the field.

The binder and the conductive agent in the bottom coating layer and the active material layer can be the conventional materials in this field, such as the binder includes at least one of polyvinylidene fluoride (PVDF), vinylidene fluoride-hexafluoropropylene copolymer, polyamide, polyacrylonitrile, polyacrylate, polyacrylic acid, polyacrylic acid salt, sodium carboxymethylcellulose (CMC), polyvinyl pyrrolidone, polyvinyl ether, polymethyl methacrylate, polytetrafluoroethylene, polyhexafluoropropylene and styrene butadiene rubber (SBR); and the conductive agent includes at least one of conductive carbon black, carbon nanotube, conductive graphite and graphene.

The electrode piece of the present disclosure can be prepared by gravure coating method and extrusion coating method and other conventional method in this field. In specific implementation, firstly, the slurry containing the raw material of bottom coating layer can be coated on the surface of the current collector by gravure coating method, and after drying, the slurry containing the active material is coated by extrusion coating method. And then, after drying and rolling, the coating layer at a position where the tab will be located is scraped or washed off, and the tab is welded on the current collector exposed in the position where the tab will be located, and then the electrode piece is obtained. Here, the coating thickness of each area can be controlled according to parameters, such as, preset positions and slope angles of the first slope area and the first normal area, to obtain the electrode piece that meets the requirements. Taking the gravure coating method as an example for explanation, for example, the gravure coating method can be used to coat the bottom coating layer on the current collector, and the gravure roller used in the gravure coating process is provided with a reserved tab groove to correspond to a position of the tab to be formed on the electrode piece, and when the bottom coating layer is composed of the second slope area and the second normal area, the gravure roller is provided with an arc surface coating part corresponding to the second slope area, so as to form the second slope area; of course, when the bottom coating layer is not provided with the second slope area (that is, the bottom coating layer is entirely composed of the second normal area), the gravure roller without the arc surface coating part can be used to carry out the coating process of the bottom coating layer.

In another aspect, the present disclosure provides a battery, including the above electrode piece.

The battery of the present disclosure may include a positive electrode piece with the above structural design (that is, the electrode piece is a positive electrode piece), or a negative electrode piece with the above structural design (that is, the electrode piece is a negative electrode piece), or it may include both a positive electrode piece with the above structural design and a negative electrode piece with the above structural design (that is, the electrode piece includes a positive electrode piece and a negative electrode piece). When the electrode piece is a positive electrode piece, the battery also includes a negative electrode piece, which may be a conventional negative electrode piece in the field. When the electrode piece is a negative electrode piece, the battery also includes a positive electrode piece, which may also be a conventional positive electrode piece in the field. The present disclosure does not impose special restrictions on this.

The battery further includes a separator located between the positive electrode piece and the negative electrode piece. The separator is used for separating the positive electrode piece and the negative electrode piece, and the separator can be a conventional separator in the field, and has no specifical restriction in the present disclosure.

Specifically, the battery of the present disclosure may be a lithium-ion battery, which may be a coiled or laminated, preferably, a coiled structure.

The battery in the present disclosure can be prepared in accordance with a conventional method in the field. For example, the positive electrode piece, the separator and the negative electrode piece are laminated in sequence, and then coiled (or laminated), to form a battery cell, and then the battery can be prepared after packaging, liquid injection, formation, capacity grading OCV (open circuit voltage) test and other process, the battery is prepared. These steps/procedures are all conventional operations in this field, without special restrictions in the present disclosure and will not be repeated here.

In order to make the purpose, technical solution and advantages of the present application more clear, the technical solution in the embodiments of the present disclosure will be described clearly and completely in combination with the examples of the present disclosure. Obviously, the described examples are part of the examples of the present disclosure, not all examples. Based on the examples of the present disclosure, all other examples obtained by those skilled in the field without creative work fall within the scope of the protection of the present application.

Example 1

(1) Preparation of Positive Electrode Piece 55 wt % of LFP, 40 wt % of PVDF and 5 wt % of conductive carbon black were mixed, N-methyl pyrrolidone (NMP) was added, and then stirred evenly to prepare a slurry of the bottom coating layer;

95 wt % of lithium cobaltate, 2 wt % of conductive carbon black, 1 wt % of carbon nanotube and 2 wt % of PVDF were mixed, NMP was added, and then stirred evenly to prepare a slurry of the positive electrode active material layer;

the slurry of the bottom coating layer was coated on both positive and negative surfaces of the positive current collector using a gravure coating process, where a first blank area with a width of about 10 mm is left in a preset tab area (that is, the area is not coated with slurry); after drying, the slurry of the positive electrode active material layer was applied to the positive and negative surfaces of the positive current collector by an extrusion coating method, and after drying, part of the coating layer in the preset tab area was removed to form a second blank area (this area is not coated with slurry) with a width of about 8 mm and directly in the middle of the first blank area; after rolling, two surfaces of the current collector were each formed with a bottom coating layer and a positive electrode active material layer, which are laminated, and a tab with a width of about 6 mm was welded directly in the middle of the second blank area to obtain a positive electrode piece;

where, according to parameters, such as, preset width and slope angle of the first slope area, the coating thickness of each area of the first surface of the current collector with a tab is controlled, the bottom coating layer 2 and the positive electrode active material layer 3 that has the first slope area 31 and the first normal area 32 are formed on the first surface of the current collector, and the thickness of the positive electrode active material layer 3 corresponding to the first normal area 32 is 50 $\mu$m, the width of the first slope area 31 is a=1.5 mm, and the first slope angle $\alpha$ is 78°; the bottom coating layer does not have a second slope area (that is, the bottom coating layer is composed of the second normal area entirely) and the thickness of the bottom coating layer is 3 $\mu$m; the minimum distance from the positive electrode active material layer to the tab is m=1 mm, and the minimum distance from the bottom coating layer to the tab is n=2 mm (that is, the distance from one end of the bottom coating layer near the tab to the end of the positive electrode active material layer near the tab is b=n−m=1 mm).

(2) Preparation of Negative Electrode Piece 96 wt % of artificial graphite, 1 wt % of conductive carbon black, 1.5 wt % of SBR and 1.5 wt % of CMC were mixed, deionized water was added, and then stirred evenly to prepare a slurry;

the slurry of the negative electrode was coated on both positive and negative surfaces of a negative current collector, and then dried and rolled to obtain a negative electrode piece.

(3) Preparation of Battery

The above positive electrode piece and the negative electrode piece were rolled, cut and formed into sheets, and then the positive electrode sheet, a separator and the negative electrode sheet were laminated in sequence, and then coiled, to form a naked battery cell. And after packaging, liquid injection, formation, capacity grading, OCV (open circuit voltage) testing and other process, a lithium-ion battery was prepared.

Example 2

The difference between this example and Example 1 is that:

96 wt % of LFP, 3 wt % of PVDF and 1 wt % of conductive carbon black were mixed, NMP was added, and then stirred evenly to prepare a slurry of a bottom coating layer (that is, raw material composition of the bottom coating layer is different from that of Example 1); in the positive electrode piece, the width of the first slope area is a=2.5 mm, and the first slope angle is $\alpha$=48°; the bottom coating layer has a second slope area and a second normal area, and the second slope angle is $\beta$=30°; in the direction near the tab, start positions of the second slope area and the first slope area are the same; n=3 mm, n−m=2 mm, and the other conditions are the same as that of Example 1.

Examples 3-6

The difference between Examples 3-6 and Example 1 lies in the difference of parameters, such as, the bottom coating layer, the positive electrode active material layer and the slope angles of the first slope area/the second slope area, as shown in Table 1 for details. Except for the differences shown in Table 1, the other conditions are the same as Example 1.

Comparative Example 1

The difference between this comparative example and Example 1 is that: there is no bottom coating layer; the positive electrode active material layer has no first slope area (that is, composed of the first normal area entirely), and other conditions are the same as Example 1.

Comparative Example 2

The difference between this comparative example and Example 1 is that the end of the bottom coating layer near the tab is aligned with the end of the positive electrode active material layer near the tab (i.e., n−m=0), and there is no slope area (i.e., the first slope angle $\alpha$=0°, the second slope angle $\beta$=0°).

Performance Test of Examples and Comparative Examples

Charging and discharging test and safety test are carried out for lithium-ion batteries of the Examples and Comparative Examples, to evaluate the normal temperature charging window (rate capability) and safety of the batteries, where charging and discharging test method: under condition of 25° C.±3° C., a lithium-ion battery is charged at charging rates of 0.5 C, 1 C, 1.5 C and 2 C, and then changed to 4.45V and then conducts a constant voltage charging, with a cut-off current of 0.05 C. The battery is fully charged and stands for 10 min, and then is discharged at a rate of 0.5 C. This is a charging and discharging cycle. After 20 times, the battery is fully charged, and then the tab area is dissected to observe lithium precipitation in the tab area, where the maximum rate without lithium precipitation is the normal temperature charging window of the battery. The normal temperature charging window of battery of each example and each comparative example is determined as shown in Table 1;

safety test method: under condition of 25° C.±3° C., a lithium-ion battery is fully charged at a charging rate of 0.5 C, with a cut-off voltage of 4.45V and a cut-off current of 0.05 C; then a nail penetration test is carried out as follows: a tungsten steel nail with a diameter of 3 mm is used to penetrate through a middle position of the battery at a speed of 100 mm/s, and then exits; and it is recorded as pass if the battery does not catch fire after nail penetration process. The full-charged nail penetration pass rate of battery of each example and comparative Example is shown in Table 1.

TABLE 1

Condition difference of each example and comparative example and measurement result of battery performance

| Example | a (mm) | n − m (mm) | α | β | Normal temperature charging window | Full-charged nail penetration pass rate * (pass/test) |
|---|---|---|---|---|---|---|
| Example 1 | 1.5 | 1 | 80° | / | 2 C. | 20/20 |
| Example 2 | 2.5 | 2 | 48° | 30° | 2 C. | 19/20 |
| Example 3 | 3 | 0 | 30° | 30° | 2 C. | 20/20 |
| Example 4 | 0.25 | 0 | 60° | 80° | 2 C. | 18/20 |
| Example 5 | 3 | 2.5 | 20° | / | 2 C. | 19/20 |
| Example 6 | 2 | 1 | 10° | 10° | 2 C. | 19/20 |
| Comparative Example 1 | / | / | / | / | 1.5 C. | 1/20 |
| Comparative Example 2 | 0 | 0 | 0 | 0 | 1.5 C. | 20/20 |

* indicates that the full-charged nail penetration pass rate = the ratio of the number of batteries passed to the total number of batteries tested. Take "19/20" in Example 2 as an example, which indicates that a total of 20 batteries have been tested, and the number of batteries that have not caught fire after the above nail penetration process is 19.

It can be seen from Table 1 that there is a slope area in the functional layer near the tab on the positive electrode piece, which is conducive to improvement of the charging window of the battery, enabling the battery to have better rate capability, safety and other performance, and at the same time, a bottom coating layer is set between the positive electrode active material layer and the current collector, which is conducive to further improvement of the safety of the battery.

The above explains the embodiments of this application. However, the present application is not limited to the above embodiments. Any modifications, equivalent replacements and improvements made within the spirit and principle of the present application shall be included in the scope of protection of the present application.

What is claimed is:

1. An electrode piece, comprising a current collector and a functional layer arranged on a first surface of the current collector, wherein a tab is further arranged in middle of the first surface, the functional layer on the first surface has a first slope area near the tab and a first normal area away from the tab, and a thickness of the first slope area gradually decreases along a direction towards the tab;

wherein the functional layer comprises an active material layer and a bottom coating layer arranged between the active material layer and the first surface of the current collector, and the active material layer has the first slope area and the first normal area;

wherein a minimum distance from a surface of the first slope area to the first surface of the current collector is greater than a maximum distance from a surface of the bottom coating layer to the first surface of the current collector;

wherein a width of the first slope area is 0.25-3 mm;

wherein a minimum distance from the active material layer to the tab is m, and a minimum distance from the bottom coating layer to the tab is n, $0 \leq n-m \leq 3$ mm; and a stripping force between the bottom coating layer and the current collector is more than 30 N/m.

2. The electrode piece according to claim 1, wherein in projection of the electrode piece parallel to a thickness direction of the electrode piece, an endpoint of the first slope area away from the tab is c, and an endpoint of the first slope area near the tab is d, an angle between a connecting line between c and d and a plane parallel to a surface of the electrode piece is an acute angle $\alpha$, and a is 10-80°.

3. The electrode piece according to claim 1, wherein the bottom coating layer has a second slope area near the tab and a second normal area away from the tab, and a thickness of the second slope area gradually decreases along a direction towards the tab.

4. The electrode piece according to claim 3, wherein, in projection of the electrode piece parallel to a thickness direction of the electrode piece, an endpoint of the second slope area away from the tab is e, and an endpoint of the second slope area near the tab is f, an angle between a connecting line between e and f and a plane parallel to a surface of the electrode piece is an acute angle $\beta$, and $\beta$ is 10-80°.

5. The electrode piece according to claim 1, wherein a minimum distance from the active material layer to the tab is not greater than a minimum distance from the bottom coating layer to the tab.

6. The electrode piece according to claim 1, wherein the electrode piece is a positive electrode piece, raw materials of the active material layer of the functional layer comprise an active material, a binder and a conductive agent; and the active material comprises at least one of lithium cobaltate, lithium manganate, lithium nickelate, lithium nickel cobalt manganate, lithium ferrous phosphate, lithium iron manganese phosphate, lithium vanadium phosphate, lithium vanadyl phosphate, lithium-rich manganese-based material and lithium nickel cobalt aluminate.

7. The electrode piece according to claim 1, wherein the electrode piece is a negative electrode piece, raw materials of the active material layer comprises an active material, a binder and a conductive agent; and the active material comprises at least one of graphite, mesocarbon microbead, soft carbon, hard carbon, silicon material, silicon oxide material, silicon carbon material and lithium titanate materials.

8. A battery, comprising the electrode piece according to claim 1.

* * * * *